United States Patent Office 3,040,055
Patented June 19, 1962

---

3,040,055
PROCESS FOR SYNTHESIZING REACTION PRODUCTS OF DECABORANE AND TETRAZOLES
Neil R. Fetter, Riverside, Calif., assignor to the United States of America as represented by the Secretary of the Navy
No Drawing. Filed July 13, 1960, Ser. No. 42,728
10 Claims. (Cl. 260—308)
(Granted under Title 35, U.S. Code (1952), sec. 266)

The invention described herein may be manufactured and used by or for the Government of the United States of America for governmental purposes without the payment of any royalties thereon or therefore.

The present invention relates to a process for the synthesis of a new series of substances from the reaction of decaborane with several tetrazoles.

Prior to this invention there were no other methods known for preparing reaction products from decaborane and the various tetrazoles.

It is, therefore, an object of this invention to provide a simple process for preparing both crystalline and amorphous products from the reaction of decaborane with various tetrazoles which might find use as propellants or propellant additives.

Another object of this invention is to provide a simple process for producing compounds having high percentages of boron, nitrogen, and hydrogen which may be of use as rocket fuels, binders or igniters.

In accordance with the present invention, a series of new compounds may be prepared by the reaction of decaborane with tetrazole and various substituted tetrazoles. The process involves the simple addition of the two reactants, decaborane and a tetrazole, in a moderating solvent which will not react appreciably with the decaborane or tetrazole. Benzene has been the most suitable solvent as most tetrazoles are soluble therein. In this invention the decaborane is dissolved in benzene, one grain per 20 ml., and the tetrazole is added. A quiet reaction usually occurs at room temperature; however, in some instances the benzene solution must be heated to reflux temperature. Both crystalline and amorphous products are recovered. Analysis of the crystalline materials indicate two tetrazole molecules are attached to a single $B_{10}H_{12}$ (decaboranyl) unit, but the amorphous materials are presumed to be alternating decaborane and tetrazole molecules. The composition of the products, both crystalline and amorphous, are not appreciably influenced by the ratio of the reactants or reaction temperatures.

The following examples serve to illustrate how the present invention may be carried out in practice; however, the invention is not restricted to the examples.

EXAMPLE I

*Decaborane and 2-Isopropyltetrazole*

4.317 mmoles of decaborane are dissolved in 20 ml. of dry benzene and, along with a magnetic stirrer, are introduced into the reaction vessel, to which 12.19 mmoles of 2-isopropyltetrazole dissolved in 20 ml. of benzene are added. This mixture is stirred and warmed for half an hour at 50° C. or until gas evolution stops. The mixture is now cooled to room temperature and the product appears gradually as a bright yellow crystalline solid which is purified by recrystallization from benzene. An analysis of the crystalline product indicates two tetrazole molecules are attached to a $B_{10}H_{12}$ unit. The composition of the product produced by these two reactants, decaborane and 2-isopropyltetrazole, is not appreciably influenced by the ratio of the reactants or reaction temperatures. This purified crystalline product melts at from 198–203° C. with considerable decomposition. The results of elemental analysis indicate two tetrazole molecules are attached to a decaborane molecule:

For $B_{10}H_{12}.2(C_4N_4H_8)$: C=27.89%, H=8.18%, N=32.53%, B=31.39%
Exp. No. 51 Found: C=26.29%, H=8.38%, N=31.44%, B=33.89%
Exp. No. 53 Found: C=25.80%, H=7.31%, N=32.05%, B=24.20%

The boron percentage in Experiment No. 51 was found by difference and is somewhat high while the boron percentage for Experiment No. 53 was found by analysis and is considerably lower than hypothesized. Although the carbon, hydrogen, and nitrogen values for compounds which may contain boron-nitrogen bonds agree reasonably with the theoretical values, the boron analyses of these and other similar compounds are usually appreciably lower than expected. An X-ray analysis of a single crystal of the decaborane-2-isopropyltetrazole product yielded cell constants, and with density measurements, an estimate of the molecular weight was made. The crystals are monoclinic and the pattern gives evidence of four molecules per unit cell, hence the molecular weight would be 340. This figure is reasonably close to 344.7 given for the molecule $B_{10}H_{12}.2(C_4N_4H_8)$. In the decaborane and 2-isopropyltetrazole the average value for the molar ratio of hydrogen to decaborane is 1.00 with an average deviation of ±0.22. Although data are somewhat scattered, they agree with the analytical results of one mole of hydrogen evolved per mole of decaborane reacted. The reaction of 2-isopropyltetrazole with decaborane may be written:

$$2C_4N_4H_8 + B_{10}H_{14} \rightarrow B_{10}H_{12}(C_4N_4H_8)_2 + H_2$$

EXAMPLE II

*Decaborane and 2-Methyl-5-Vinyltetrazole*

20.93 mmoles of decaborane, dissolved in dry benzene, and 30.87 mmoles of 2-methyl-5-vinyltetrazole, also dissolved in benzene, are stirred together in a reaction vessel at a temperature ranging from 55° C. to 65° C. for about 30 minutes, or until gas evolution stops. The mixture is now cooled to room temperature and the product appears as a yellow powder. The following table summarizes the runs made with decaborane (DB) and 2-methyl-5-vinyltetrazole (2,5-MVT):

| Run No. | mmoles DB | mmoles 2,5-MVT | 2,5-MVT DB | Product Characteristic |
|---|---|---|---|---|
| 44 | 15.92 | 65.31 | 4.10 | Yellow powder. |
| 47 | 17.17 | 28.98 | 1.69 | Do. |
| 48 | 20.93 | 30.98 | 1.48 | Do. |
| 49a | 10.77 | 23.17 | 2.15 | Do. |
| 49b | 9.30 | 20.18 | 2.17 | Do. |

These results show that approximately two-thirds of a mole of hydrogen is evolved per mole of decaborane. In runs 49a and 49b the volume of gas was measured and in run 49a, 8.48 mmoles was evolved representing 7.21 mmoles of hydrogen. The molar ratio of hydrogen to decaborane is 0.667. In run 49b, the gas volume corresponded to 7.47 mmoles evolved of which 6.35 mmoles was hydrogen. The molar ratio of hydrogen to decaborane is 0.683. Although no solvent was found which would re-crystallize the decaborane-2-methyl-5-vinyltetrazole product, a sample was washed five times with benzene, vacuum dried and submitted for analysis. The experimental results agree closely with a compound having two tetrazole molecules attached to a $B_{10}H_{12}$ unit:

Found: C=28.17%, H=6.32%, N=32.09%, B=33.42%.

For $B_{10}H_{12} \cdot 2(C_4N_4H_6)$: C=28.21%, H=7.11%, N=32.91%, B=31.77%

EXAMPLE III

Decaborane and 5-Ethyltetrazole 0.0125 mole of decaborane is dissolved in 20 ml. of benzene and 0.0314 mole of 5-ethyltetrazole is added to the reaction vessel. A magnetic stirrer is now introduced and the mixture is stirred and heated gently at about 50° C. for five hours. A viscous yellow layer separates from the benzene which is decanted off, and the product washed with fresh benzene and vacuum evaporated for two hours at room temperature. The following table summarizes the runs made with decaborane (DB) and 5-ethyltetrazole (5-ET).

| Run No. | mmoles DB | mmoles 5-ET | Tetrazole DB | Product Characteristic |
|---|---|---|---|---|
| 62 | 10.55 | 24.31 | 2.30 | Light yellow amorphous solid. |
| 63 | 11.05 | 24.13 | 2.18 | Do. |
| 64 | 12.48 | 31.35 | 2.51 | Do. |

If the reactant of Example III are warmed without a solvent, a violent explosion occurs a few minutes after mixing.

EXAMPLE IV

Decaborane and 2-Methyl-5-(2-Chloroethyl)Tetrazole 4.85 mmoles of decaborane are dissolved in 20 ml. of dry benzene (as in previous examples), and along with a magnetic stirrer, are introduced into the reaction vessel to which 19.90 mmoles of 2-methyl-5-(2-chloroethyl)-tetrazole dissolved in 20 ml. of benzene are added. This mixture is warmed gently at 50–65° C. until gas evolution stops, or for about 30 minutes. The mixture is now cooled to room temperature and a light yellow powder forms. Re-crystallization of this product from dry acetone produces a crop of bright yellow crystals which melt at from 215–217° C. The following table summarizes the runs made with decaborane (DB) and 2-methyl-5-(2-chloroethyl)tetrazole (2,5-MCT):

| Run No. | mmoles DB | mmoles 5-ET | Tetrazole DB | Product Characteristic |
|---|---|---|---|---|
| 52 | 1.86 | 6.73 | 3.62 | Light yellow powder. |
| 57 | 8.26 | 10.80 | 1.31 | Do. |
| 58 | 4.85 | 19.90 | 4.10 | Do. |
| 59 | 9.76 | 21.15 | 2.17 | Do. |

Elemental analyses of the pure compound indicate two tetrazole molecules are attached to a $B_{10}H_{12}$ unit.

For $B_{10}H_{12} \cdot 2(C_4N_4H_7Cl)$: C=23.24, H=6.34, N=27.11, B=26.17, Cl=17.15
Found: C=22.21, H=6.27, N=25.81, B=29.52, Cl=16.20
Found: C=21.74, H=6.01, N=25.81, B=30.42, Cl=16.02

The molar hydrogen to decaborane ratio for the 2-methyl-5-(2-chloroethyl)tetrazole complex was 1:15±0.33 for four preparations, suggesting the following reaction similar to the 2-isopropyltetrazole set forth in Example I:

$2C_4N_4H_7Cl + B_{10}H_{14} \rightarrow B_{10}H_{12}(C_4N_4H_7Cl)_2 + H_2$

EXAMPLE V

Decaborane and 2-Ethyl-5-Aminotetrazole

The same procedure as described in the examples heretofore set out are followed. 13.21 mmoles of decaborane dissolved in benzene are added to 23.45 mmoles of 2-ethyl-5-aminotetrazole. This mixture is stirred and warmed to 60° C. for one hour. The product from this reaction is a dark yellow amorphous solid which is soluble in benzene. It is recovered by simple vacuum evaporation at room temperature.

EXAMPLE VI

Decaborane and 5-Phenyltetrazole 9.78 mmoles of decaborane and 15.22 mmoles of 5-phenyltetrazole are refluxed in benzene at a temperature of about 50° C. for about 12 hours, or until the only visible sign of reaction, gas evolution, stops. The reaction product is a white crystalline powder. An X-ray powder pattern indicated a new substance although 5-phenyltetrazole is not soluble in benzene.

EXAMPLE VII

Decaborane and 2-Methylpolyvinyltetrazole 2.462 grams of 2-methylpolyvinyltetrazole and dissolved in 30 ml. of dry chloroform and 1.128 grams of decaborane are added to the chloroform solution. The mixture is now heated to 50° C. and stirred for 15 minutes. The reaction product turned bright yellow and set into a jelly-like mass. This material was vacuum dried for two hours resulting in a stiff amorphous solid. The following table summarizes the runs made with decaborane and 2-methylpolyvinyltetrazole where chloroform was employed as the solvent in runs 66 and 68 and ethylene dichloride was employed in run 67. 2-methylpolyvinyltetrazole is soluble in both chloroform and ethylene dichloride.

| Run No. | mmoles decaborane | mmoles poly(2-methyl-5-vinyltetrazole) | Tetrazole DB | Product Characteristic |
|---|---|---|---|---|
| 66 | 9.41 | 21.32 | 2.26 | Bright yellow brittle solid. |
| 67 | 8.56 | 23.45 | 2.74 | Do. |
| 68 | 9.22 | 22.34 | 2.42 | Do. |

Care must be exercised in handling this product as it will ignite spontaneously in air with friction.

EXAMPLE VIII

Decaborane and Tetrazole 7.34 mmoles of decaborane and 23.25 mmoles of tetrazole are mixed together and heated to benzene reflux temperature for three hours plus additional stirring for two hours. The crude product is a light yellow crystalline powder after three washings with dry benzene and drying in a vacuum.

EXAMPLE IX

Decaborane and 5-Aminotetrazole 13.86 mmoles of decaborane and 30.18 mmoles of 5-aminotetrazole are mixed together and are refluxed at benzene temperature for 20 hours until the solid 5-aminotetrazole gradually changes from white to light yellow. The product is recovered by filtration, washed with benzene and dried under vacuum at room temperature. The final material is a very light yellow fluffy, crystalline powder.

The decaborane used in all of the reactions hereinbefore described was sublimed under vacuum to obtain a pure white crystalline product which was stored in a bottle in contact with dry air. The tetrazoles were all prepared in the laboratory at the U.S. Naval Ordnance Test Station, China Lake, California, with estimated purities of about 95% or better for the solid and 98 to 99% for the liquids. The benzene employed as a solvent in most of the examples cited was stored and distilled over $P_2O_5$ before use. The acetone used in one case for recrystallization was reagent grade used directly without further purification. All other solvents and reagents were reagent grade.

The 5-substituted tetrazoles are more acidic than the others and require longer reaction periods, higher temperatures, and evolve less hydrogen. This would tend to point toward a different composition, the tetrazoles attaching to different boron atoms on decaborane.

It is seen from the foregoing that this invention provides a simple method for preparing reaction products of boron hydrides with tetrazoles in pure form which permits further use of the compounds.

Various modifications are possible and may be obviously resorted to by those skilled in the art without departing from the spirit and scope of the invention as hereinafter defined by the appended claims.

What is claimed is:

1. The method for the preparation of reaction products of decarborane and a tetrazole comprising the steps of heating together decaborane and a tetrazole selected from the group consisting of lower alkyl, vinyl, phenyl, amino, and lower alkyl chloro tetrazoles in a moderating solvent from the group consisting of benzene, ethylene dichloride and chloroform, and stirring at room temperature until gas evolution stops.

2. The product produced by the method of claim 1 in which two tetrazole molecules are attached to a single decaborane unit.

3. The method for the preparation of a reaction product of decaborane and 2-isopropyltetrazole having the empirical formula $B_{10}H_{12} \cdot 2(C_4N_4H_8)$ which comprises warming decaborane and 2-isopropyltetrazole in dry benzene to a temperature of about 50° C. for about 30 minutes, which product is characterized by bright yellow monoclinic crystals with a melting point of 198–203° C.

4. The method for the preparation of a reaction product of decaborane and 2-methyl-5-vinyltetrazole having the empirical formula $B_{10}H_{12} \cdot 2(C_4N_4H_6)$ which comprises heating decaborane and 2-methyl-5-vinyltetrazole in benzene to a temperature ranging from about 55° to 65° C. for about 30 minutes, which product is characterized by light yellow crystals.

5. The method for the preparation of a reaction product of decaborane and 5-ethyltetrazole which comprises heating decaborane and 5-ethyltetrazole in benzene to a temperature of about 50° C. for about five hours, which product is a light yellow amorphous solid.

6. The method for the preparation of a reaction product of decaborane and 2-methyl-5-(2-chloroethyl)tetrazole having the empirical formula $B_{10}H_{12} \cdot 2(C_4N_4H_7Cl)$ which comprises heating decaborane and 2-methyl-5-(2-chloroethyl)tetrazole in benzene to a temperature of from about 50° to 65° C. until gas evolution stops, which product is characterized by bright yellow crystals soluble in acetone and having a melting point of 215–217° C.

7. The method for the preparation of a reaction product of decaborane and 2-ethyl-5-aminotetrazole which comprises heating decaborane and 2-ethyl-5-aminotetrazole in benzene at a temperature of about 60° C. for one hour.

8. The method for the preparation of a reaction product of decaborane and 5-phenyltetrazole which comprises refluxing decaborane and 5-phenyltetrazole in benzene at a temperature of about 50° C. for about 12 hours.

9. The method for the preparation of a reaction product of decaborane and 2-methylpolyvinyltetrazole which comprises heating together decaborane and 2-methylpolyvinyltetrazole in chloroform solution to a temperature of 50° C. for about 15 minutes, which product is a bright yellow amorphous solid.

10. The method for the preparation of a reaction product of decaborane and 5-aminotetrazole which comprises refluxing decaborane and 5-aminotetrazole at benzene temperature for about 20 hours, which product is a light yellow, fluffy crystalline powder.

References Cited in the file of this patent

UNITED STATES PATENTS 2,961,444     Aftandilian _____ Nov. 22, 1960